(12) United States Patent  
McKenzie et al.

(10) Patent No.: US 9,374,882 B2  
(45) Date of Patent: Jun. 21, 2016

(54) FINAL FOCUS ASSEMBLY FOR EXTREME ULTRAVIOLET LIGHT SOURCE

(71) Applicant: ASML Netherlands B.V., Veldhoven (NL)

(72) Inventors: Paul A. McKenzie, Encinitas, CA (US); Robert A. Bergstedt, Carlsbad, CA (US); Paul William Binun, Chula Vista, CA (US)

(73) Assignee: ASML Netherlands B.V., Veldhoven (NL)

( * ) Notice: Subject to any disclaimer, the term of this patent is extended or adjusted under 35 U.S.C. 154(b) by 0 days.

(21) Appl. No.: 14/104,200

(22) Filed: Dec. 12, 2013

(65) Prior Publication Data

US 2015/0173164 A1 Jun. 18, 2015

(51) Int. Cl.
*H05G 2/00* (2006.01)
*G02B 17/06* (2006.01)

(52) U.S. Cl.
CPC ............ *H05G 2/008* (2013.01); *G02B 17/0615* (2013.01); *H05G 2/001* (2013.01)

(58) Field of Classification Search
CPC ......... H05G 2/00; H05G 2/001; H05G 2/003; H05G 2/005; H05G 2/008
USPC ..................... 250/493.1, 503.1, 504 R, 504 H
See application file for complete search history.

(56) References Cited

U.S. PATENT DOCUMENTS

| | | | |
|---|---|---|---|
| 7,297,898 B2 | 11/2007 | Zeller et al. | |
| 8,000,212 B2 | 8/2011 | Senekerimyan et al. | |
| 8,173,985 B2 * | 5/2012 | Bergstedt et al. | 250/504 R |
| 8,283,643 B2 | 10/2012 | Partlo et al. | |
| 2008/0073598 A1 * | 3/2008 | Moriya | H05G 2/001 250/504 R |
| 2010/0078577 A1 | 4/2010 | Moriya et al. | |
| 2010/0078580 A1 * | 4/2010 | Endo et al. | 250/504 R |
| 2010/0220756 A1 * | 9/2010 | Krzysztof | H01S 3/235 372/38.02 |
| 2011/0141865 A1 * | 6/2011 | Senekerimyan et al. | 369/47.15 |
| 2011/0220816 A1 * | 9/2011 | Kakizaki | H05G 2/003 250/504 R |
| 2012/0080584 A1 * | 4/2012 | Partlo et al. | 250/214.1 |
| 2012/0223257 A1 * | 9/2012 | Nagai | G03F 7/70025 250/504 R |
| 2013/0320232 A1 * | 12/2013 | Hori | G21K 5/04 250/432 R |
| 2014/0085741 A1 * | 3/2014 | Lambert | 359/859 |

OTHER PUBLICATIONS

Schepler, Herman, "Development of an Aspheric Lens Surface", American Journal of Physics 18, 385-387, 1950).*
Schepler, Herman, "Development of an Aspheric Lens Surface", American Journal of Physics 18, 385-387, 1950.*
Igor V. Fomenkov, et al., "Laser Produced Plasma Light Source for EUVL," published at http://www.cymer.com/files/pdfs/Technology/2011/Laser_Produced_Plasma_Light_Source_for_EUVL.pdf in 2011, 6 pages.
"EUV Lithography," Cymer, LLC, published as early as Jan. 24, 2012 at http://www.cymer.com/euv_lithography/, captured using the waybackmachine on Jan. 24, 2012, 1 page.

* cited by examiner

*Primary Examiner* — Jack Berman
*Assistant Examiner* — David E Smith
(74) *Attorney, Agent, or Firm* — DiBerardino McGovern IP Group LLC

(57) ABSTRACT

An extreme ultraviolet light system includes a target material delivery system configured to produce a target material; and a beam delivery system that is configured to receive an amplified light beam emitted from a drive laser system and to direct the amplified light beam toward a target location that receives the target material. The beam delivery system includes a final focus assembly that focuses the amplified light beam at a focal location to enable interaction between the amplified light beam and the target material to cause the target material to be converted into a plasma that emits extreme ultraviolet light. The final focus assembly includes at least one transmissive optical element having at least one curved surface through which the amplified light beam travels; and at least one reflective optical element having at least one curved surface on which the amplified light beam is reflected.

26 Claims, 9 Drawing Sheets

# FINAL FOCUS ASSEMBLY FOR EXTREME ULTRAVIOLET LIGHT SOURCE

TECHNICAL FIELD

The disclosed subject matter relates to a hybrid final focus assembly for amplified light of an extreme ultraviolet light (EUV) laser system.

BACKGROUND

Extreme ultraviolet (EUV) light, for example, electromagnetic radiation having wavelengths of around 50 nm or less (also sometimes referred to as soft x-rays), and including light at a wavelength of about 13 nm, can be used in photolithography processes to produce extremely small features in substrates, for example, silicon wafers.

Methods to produce EUV light include, but are not necessarily limited to, converting a material into a plasma state that has an element, for example, xenon, lithium, or tin, with an emission line in the EUV range. In one such method, often termed laser produced plasma ("LPP"), the required plasma can be produced by irradiating a target material, for example, in the form of a droplet, stream, or cluster of material, with an amplified light beam that can be referred to as a drive laser. For this process, the plasma is typically produced in a sealed vessel, for example, a vacuum chamber, and monitored using various types of metrology equipment.

$CO_2$ amplifiers and lasers, which output an amplified light beam at a wavelength of about 10600 nm, can present certain advantages as a drive laser irradiating the target material in an LPP process. This may be especially true for certain target materials, for example, for materials containing tin. For example, one advantage is the ability to produce a relatively high conversion efficiency between the drive laser input power and the output EUV power. Another advantage of $CO_2$ drive amplifiers and lasers is the ability of the relatively long wavelength light (for example, as compared to deep UV at 198 nm) to reflect from relatively rough surfaces such as a reflective optic that has been coated with tin debris. This property of 10600 nm radiation can allow reflective mirrors to be employed near the plasma for, for example, steering, focusing and/or adjusting the focal power of the amplified light beam.

SUMMARY

In some general aspects, an extreme ultraviolet light system includes a drive laser system that produces an amplified light beam; a target material delivery system configured to produce a target material; and a beam delivery system that is configured to receive the amplified light beam emitted from the drive laser system and to direct the amplified light beam toward a target location that receives the target material. The beam delivery system includes a final focus assembly that focuses the amplified light beam at a focal location that enables interaction between the amplified light beam and the target material to cause the target material to be converted into a plasma that emits extreme ultraviolet light. The final focus assembly includes at least one transmissive optical element having at least one curved surface through which the amplified light beam travels; and at least one reflective optical element having at least one curved surface on which the amplified light beam is reflected.

Implementations can include one or more of the following features. For example, the at least one transmissive optical element can be passive.

The light system can include a moveable stage on which the transmissive optical element is attached, the moveable stage moving along a direction that is parallel with or at an angle relative to the optical axis of the amplified light beam as it passes through the transmissive optical element.

The at least one transmissive optical element can include a lens. The curved surface of the lens can be a conic section. The curved surface of the lens can be convex.

The at least one transmissive optical element can be made of a crystalline solid. The crystalline solid can be Zinc Selenide.

The at least one reflective optical element can include a convex mirror and a concave mirror. The at least one reflective optical element can have a curved surface that is a conic section. The conic section can be an ellipse. The at least one reflective optical element can include two or more curved mirrors, in which respective focal points of the mirrors do not coincide with each other.

The at least one transmissive optical element can be farther away from the target location than the at least one reflective optical element. The at least one transmissive optical element can be outside of a direct path of target material that is ejected away from the target location when the amplified light beam is focused at the focal location and the target material interacts with the focused amplified light beam. The at least one transmissive optical element can be greater than 400 mm from the target location.

The focal location can overlap the target location. The focal location can overlap the target material.

A focal length of the optical element within the final focus assembly that is closest to the focal location can be greater than an effective focal length of the final focus assembly.

In other general aspects, a beam delivery system for an extreme ultraviolet light system includes beam directing optical elements configured to receive an amplified light beam emitted from a drive laser system and to direct the amplified light beam toward a target location at which a target material is directed; and a final focus assembly that focuses the amplified light beam at a focal location that enables interaction between the amplified light beam and the target material to cause the target material to be converted into a plasma that emits extreme ultraviolet light. The final focus assembly includes at least one transmissive optical element having at least one curved surface through which the amplified light beam travels; and at least one reflective optical element having at least one curved surface on which the amplified light beam is reflected.

In another general aspect, a method for producing extreme ultraviolet light includes producing a target material at a target location; supplying pump energy to a gain medium of at least one optical amplifier in a drive laser system to produce an amplified light beam; and focusing the amplified light beam onto a focal location that enables optical interaction between the amplified light beam and the target material to cause the target material to be converted into a plasma that emits extreme ultraviolet light. Focusing the amplified light beam includes modifying a wavefront curvature of the amplified light beam by transmitting the amplified light beam through a curved surface of a transmissive optical element; and modifying the wavefront curvature of the amplified light beam including at least reflecting the amplified light beam that was transmitted through the curved surface of the transmissive optical element off a curved surface of a reflective optical element so that the amplified light beam is focused to the target location.

Implementations can include one or more of the following features. For example, the method can include reflecting the amplified light beam transmitted through the curved surface of a transmissive optical element off a curved surface of another reflective optical element. The method can include cooling a non-reflective side of the reflective optical element.

The method can include adjusting the focal location by translating the transmissive optical element along the optical axis of the amplified light beam. The method can include overlapping the focal location with the target location.

In other general aspects, a beam delivery system for an extreme ultraviolet light system includes beam directing optical elements configured to receive an amplified light beam emitted from a drive laser system and to direct the amplified light beam toward a target location at which a target material is directed; and a final focus assembly configured to focus the amplified light beam. The final focus assembly includes at least one transmissive optical element defining at least one curved surface through which the amplified light beam travels; and at least one reflective optical element defining at least one curved surface on which the amplified light beam is reflected. In use, the transmissive optical element is further from the target location than the reflective optical element.

Implementations can include one or more of the following features. For example, in use, the transmissive optical element can be positioned outside of a direct path of the target location.

DRAWING DESCRIPTION

DESCRIPTION

Figure 1:
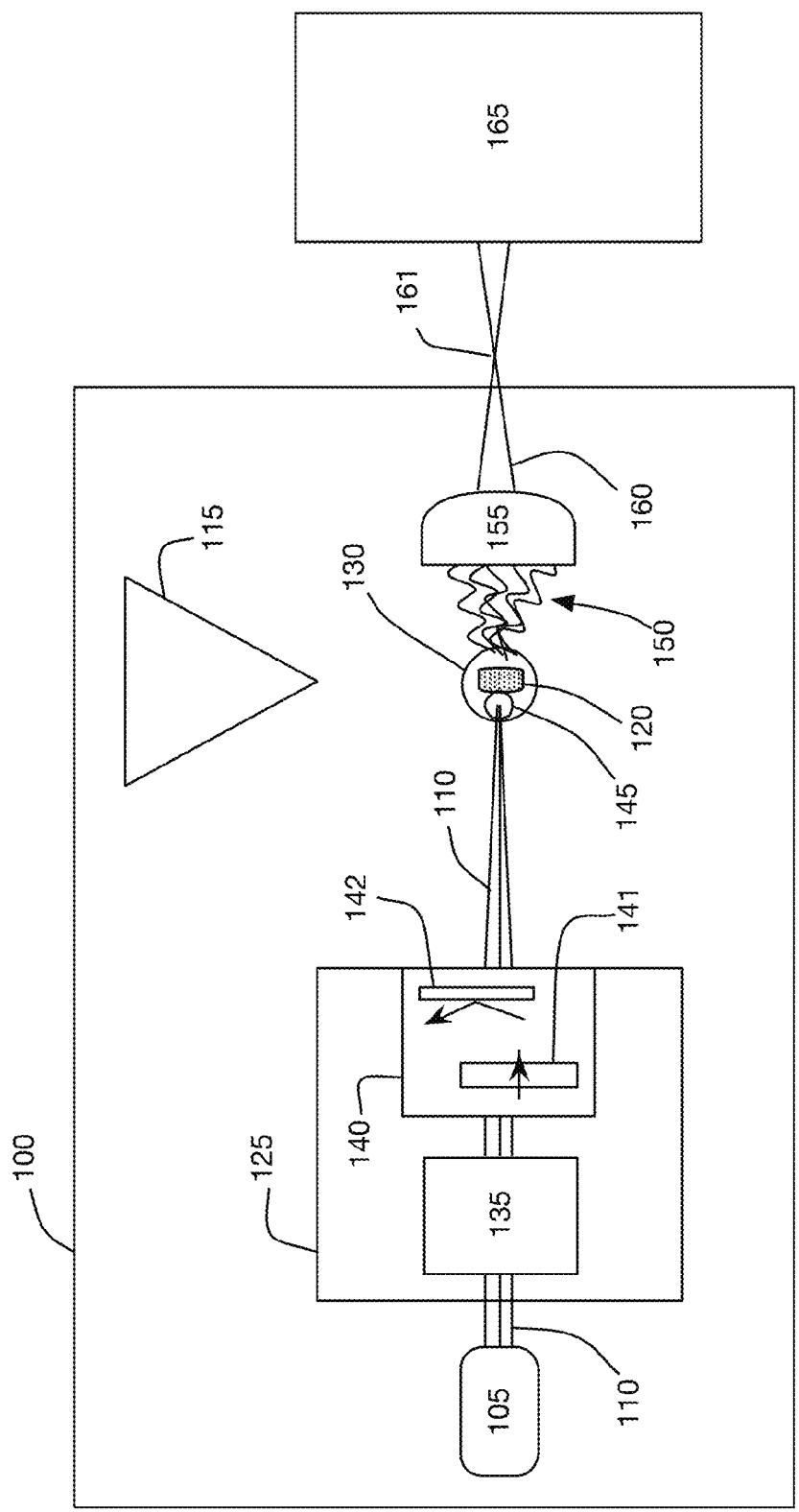
FIG. 1 is a block diagram of an extreme ultraviolet light system including a hybrid final focus assembly having at least one curved-surface transmissive optical element and at least one curved-surface reflective optical element to thereby focus an amplified light beam at a focal location.

Referring to FIG. 1, an extreme ultraviolet light system 100 includes a drive laser system 105 that produces an amplified light beam 110, a target material delivery system 115 configured to produce a target material 120, and a beam delivery system 125 that is configured to receive the amplified light beam 110 emitted from the drive laser system 105 and to direct the amplified light beam 110 toward a target location 130 that receives the target material 120. The beam delivery system 125 includes, among other components 135, a final focus assembly 140 that focuses the amplified light beam 110 at a focal location 145 that enables interaction between the amplified light beam 110 and the target material 120 to cause the target material 120 to be converted into a plasma that emits extreme ultraviolet light 150.

The final focus assembly 140 is that part of the beam delivery system 125 that modifies the wavefront of the amplified light beam 110 to change its beam divergence and cause it to focus at the focal location 145. Thus, in the hypothetical example in which the wavefront of the amplified light beam 110 that enters the final focus assembly 140 has a zero curvature (and is therefore collimated), then the output of the final focus assembly 140 is an amplified light beam having a positive curvature, which means that it is converging (or the center of the wavefront is pointing opposite to a propagation direction of the amplified light beam), that is, the wavefront is retarded when compared to a wavefront edge. In another example in which the wavefront of the amplified light beam 110 that enters the final focus assembly 140 has a positive curvature (converging) or a negative curvature (diverging), then the output of the final focus assembly 140 converges. Therefore, the final focus assembly 140 positively alters the curvature of the wavefront of the amplified light beam 110 output from the assembly 140 relative to the amplified light beam 110 that enters the final focus assembly 140 such that the amplified light beam 110 is focused at the focal location 145.

The final focus assembly 140 is designed as a hybrid assembly, which means that it includes at least one transmissive optical element 141 having at least one curved surface through which the amplified light beam travels; and at least one reflective optical element 142 having at least one curved surface on which the amplified light beam 110 is reflected. The optical element 141 is transmissive because the amplified light beam 110 enters the transmissive optical element 141 at a first location and exits the transmissive optical element 141 at another location after passing through the material of the transmissive optical element 141.

Because the surfaces of the transmissive optical element 141 and the reflective optical element 142 are curved, they both serve to modify the wavefront of the amplified light beam 110 to thereby cause the amplified light beam 110 to focus at the focal location 145. As discussed below, the final focus assembly 140 can include additional optical elements (for example, another reflective optical element) that include curved surfaces that serve to modify the wavefront of the amplified light beam 110 to cause it to focus at the focal location 145.

The extreme ultraviolet light system 100 also typically includes a light collector 155 that captures at least some of the light 150 emitted from the plasma and directs the captured light 160 to an optical apparatus 165 that uses the captured extreme ultraviolet light 160 in a specific application. The light collector 155 has a first focus at the target location 130 or the focal location 145, and a second focus at an intermediate location 161 (also called an intermediate focus) where the EUV light 160 can be output from the extreme ultraviolet light system 100 and can be input to the optical apparatus 165.

Figure 2:
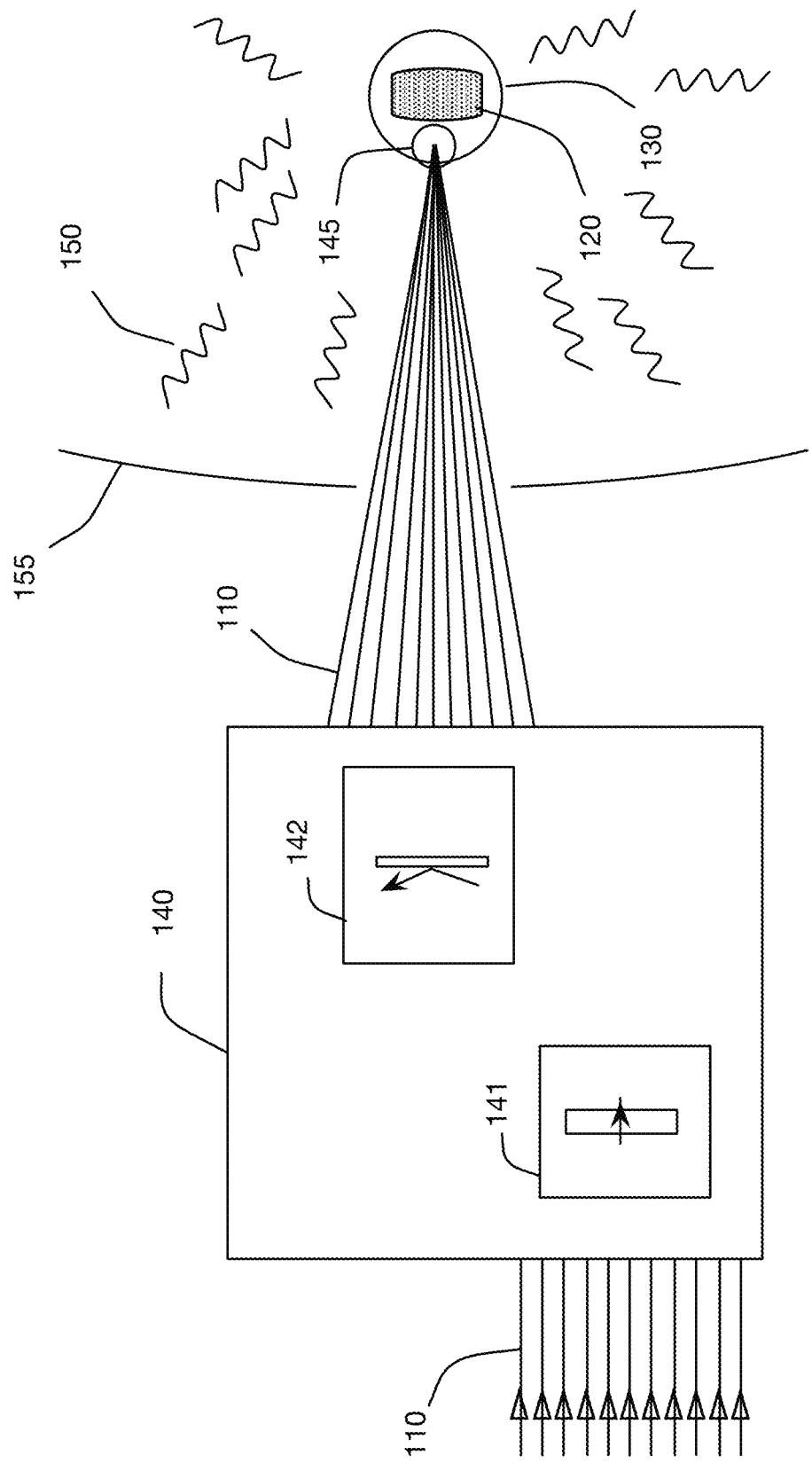
FIG. 2 is a block diagram of an exemplary hybrid final focus assembly in which the focal location is offset from a target location.

FIG. 2 shows a close-up schematic of the final focus assembly 140 and how it modifies the wavefront of the amplified light beam 110 so that it is focused at the focal location 145.

Figure 3:
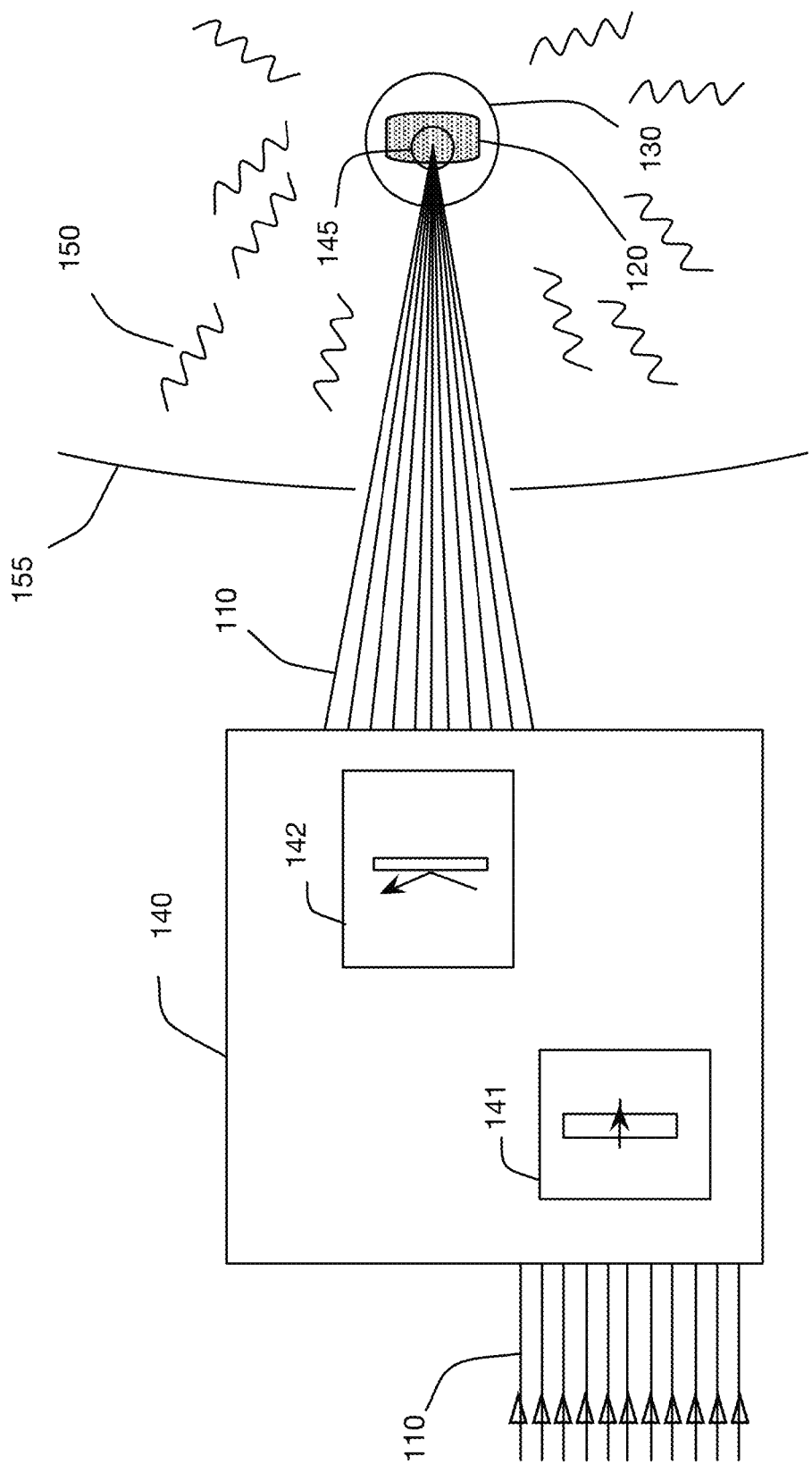
FIG. 3 is a block diagram of an exemplary hybrid final focus assembly in which the focal location overlaps a target location.

The focal location 145 needs to be close enough to the target material 120 to enable the amplified light beam 110 to interact with the target material 120 in a manner that causes the target material 120 to be converted into the plasma that emits extreme ultraviolet light 150. Thus, it is possible for the focal location 145 to overlap the target location 130, but the focal location 145 does not actually overlap with the target material 120, as shown in FIG. 2. In other implementations, such as shown in FIG. 3, the focal location 145 overlaps the target material 120.

Figure 4:
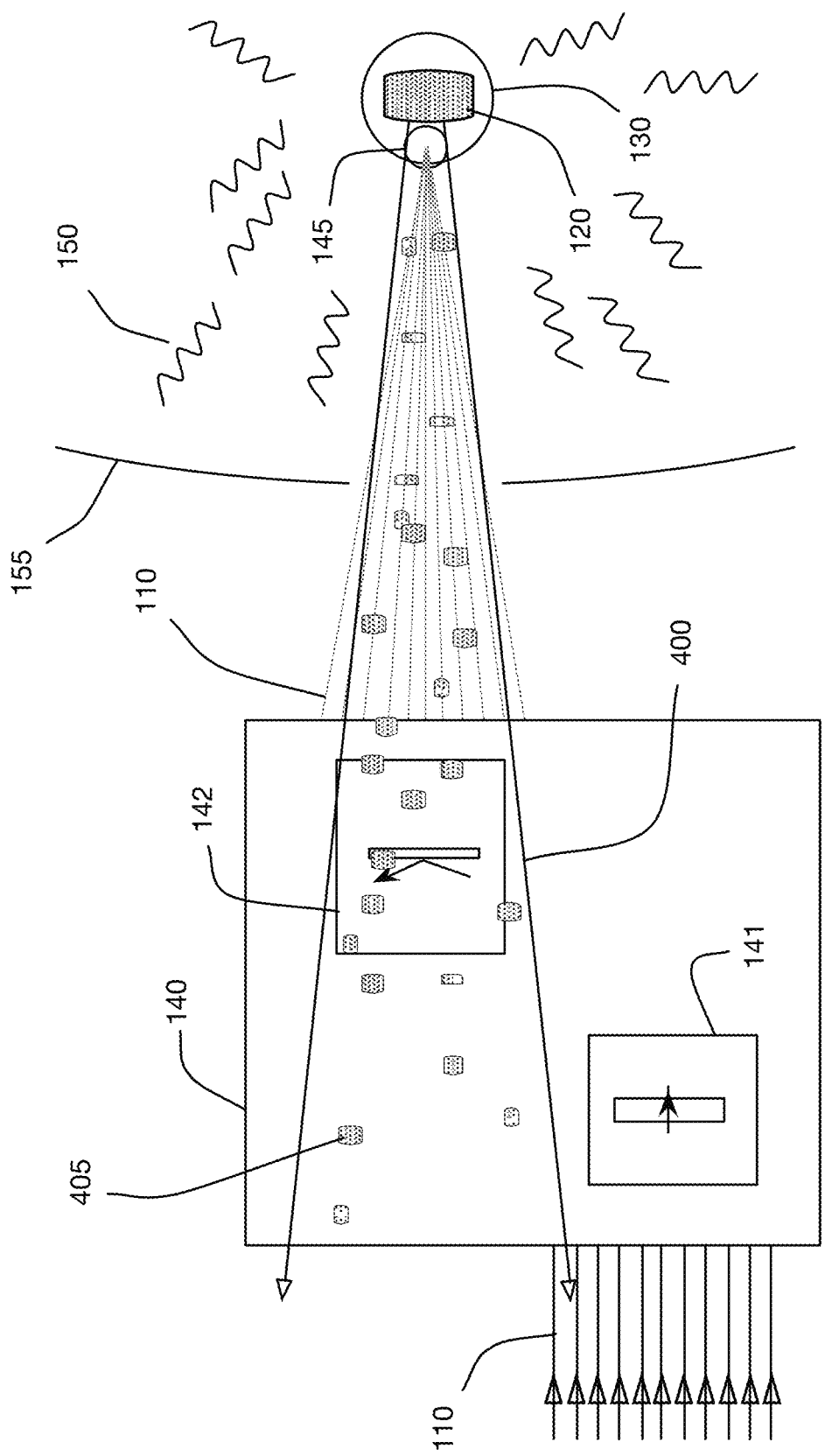
FIG. 4 is a block diagram of an exemplary hybrid final focus assembly showing the relative placement between elements of the assembly and a direct path of ejected target material.

In some implementations, such as shown in FIG. 4, the transmissive optical element 141 is farther away from the target location 130 than the reflective optical element 142. For example, in some implementations, the transmissive optical element 141 is greater than 400 mm from the target location 130. But, it can be even farther away, for example, greater than 500 mm from the target location 130.

Additionally, as also shown in FIG. 4, the transmissive optical element 141 can be positioned to be outside a direct path 400 of target material 405 that is ejected away from the target location 130 when the amplified light beam 110 is focused at the focal location 145 to interact with the target material 120. The direct path 400 of the ejected target material 405 is the path that the ejected target material 405 takes without interacting with any optical elements such as the reflective optical element 142. Thus, if there is ejected target material 405, it instead collects on the reflective optical element 142, which can be cooled from behind, has a higher thermal conductivity than the transmissive optical element 141, and thus would not suffer as much thermal degradation in optical focusing ability. By positioning the transmissive optical element 141 outside the direct path 400, contamination of target material 405 on the transmissive optical element 141 is avoided or reduced and thermal degradation is reduced. This is important because the transmissive optical element 141 is more susceptible to thermal effects if it becomes contaminated with the target material 405 because it can only be cooled along the edge, and can get much hotter than the reflective optical element 142.

Any one or more of the optical elements 141, 142 can be stationary within the final focus assembly 140. Alternatively, one or more of the optical elements 141, 142 can be set up on an actuation system to be moveable within the final focus assembly 140 to provide for adjustment of the focal location 145, among other adjustments, which will be discussed below in greater detail.

Figure 5:
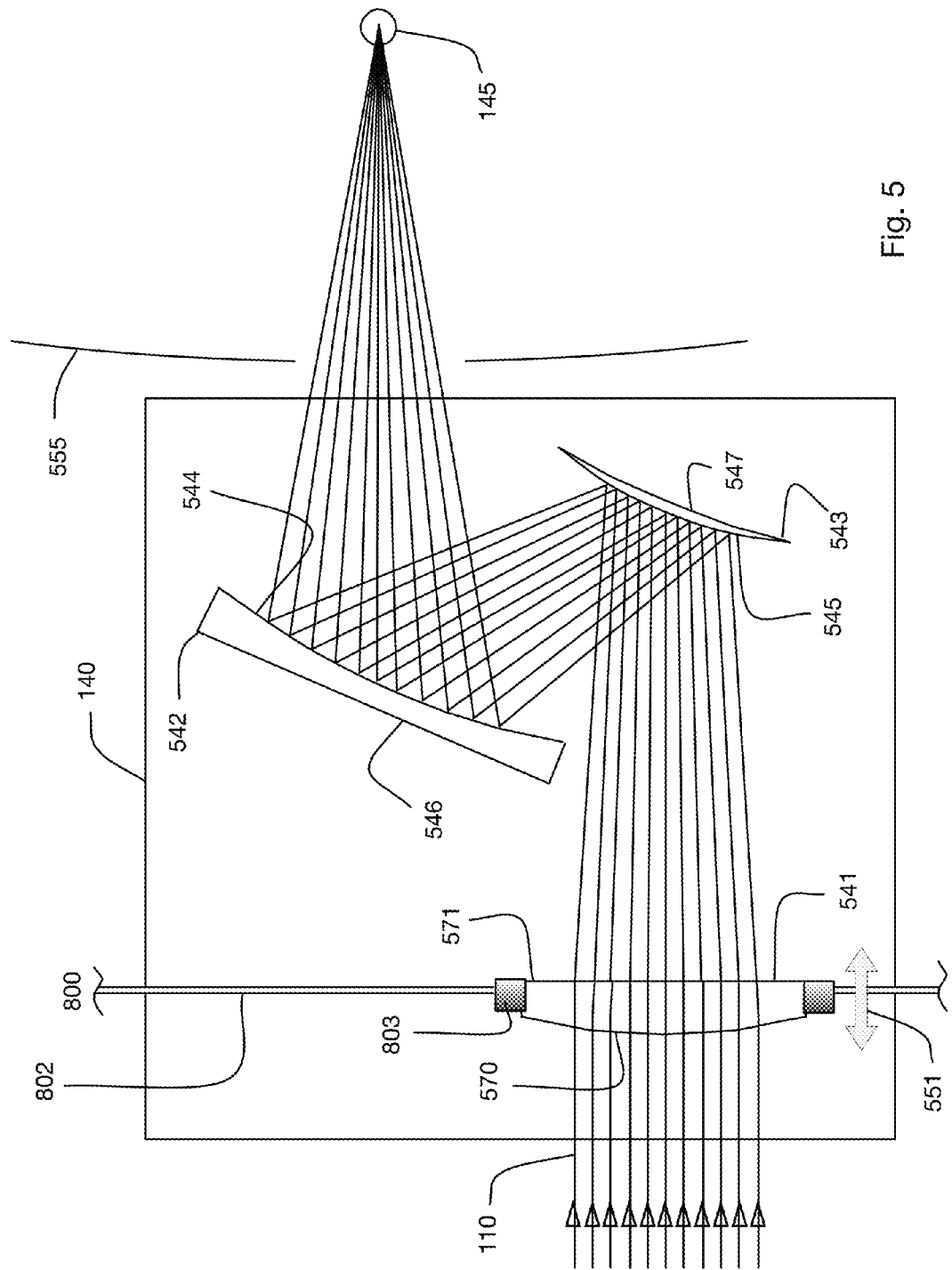
FIG. 5 is a block diagram showing the optical layout of an exemplary hybrid final focus assembly in which the at least one transmissive optical element includes a lens and the at least one reflective optical element includes two mirrors having curved surfaces.

Referring to FIG. 5, in one implementation, the final focus assembly 140 includes one transmissive optical element 541, a concave reflective optical element 542, and a convex reflective optical element 543. The transmissive optical element 541 is farther from the focal location 145 and the target location 130 than either of the reflective optical elements 542, 543 and is not in the direct path of ejected target material.

The transmissive optical element 541 is a lens that includes at least one curved surface 570. In this example, the curved surface 570 is convex and the back surface 571 is flat or concave. The curved surface 570 can be a conic section, which means it is a curve that is obtained by the intersection of a cone with a plane. For example, the curved surface 570 can be an aspheric shape. Other possible conic sections include parabolas, ellipses, and hyperbolas.

In some implementations, the transmissive optical element 541 is made of a crystalline solid such as, for example, Zinc Selenide (ZnSe), which can be coated with an anti-reflection coating.

In some implementations, the transmissive optical element 541 can be a passive device, which means that its curved surface 570 is not modified in shape during operation by an external active device. In other implementations, the transmissive optical element 541 is an active device, which means that its curved surface 570 is actively modulated or modified. For example, the curved surface 570 could be a deformable optical surface such as a varifocal lens in which the surface of the lens is deformed due to constriction.

In some implementations, the entire transmissive optical element 541 is physically attached to a translation device such as a moveable translation stage that moves the transmissive optical element 541 along a direction 551. The direction 551 can be parallel with the optical axis of the amplified light beam 110 as it passes through the element 541 or the direction 551 can be at an angle relative to the optical axis of the amplified light beam 110 as it passes through element 541. In this way, the focal location 145 can be adjusted by moving or translating the transmissive optical element 541 along the direction 551.

The concave reflective optical element 542 is a mirror that includes a reflective curved surface 544 from which the amplified light beam 110 is reflected. The curved surface 544 is concave. The curved surface 544 can be a conic section, such as, for example, an aspheric shape such as elliptical or parabolic. The convex reflective optical element 543 is a mirror that includes a reflective curved surface 545 at which the amplified light beam 110 is reflected. The curved surface 545 is convex. The curved surface 545 can be a conic section, such as, for example, an aspheric shape such as elliptical or parabolic.

One or more of the reflective optical elements 542, 543 can be made of a substrate, and the reflective curved surface (or surfaces) of the reflective optical elements 542, 543 can be formed by a reflective coating provided on the substrate. One or more of the substrate and the reflective coating can be made of a metal such as copper (Cu) or a metal alloy. In other implementations, the reflective coating can be a dielectric coating, depending on the wavelength to be reflected. One or more of the reflective optical elements 542, 543 can also be catadioptric, which means it could include a transmissive portion that bends the light in addition to the reflective surface. In other implementations, it is possible that the substrate of the reflective optical elements 542, 543 form the reflective curved surface, without requiring a separate coating.

Back sides 546, 547 of respective reflective optical elements 542, 543 can be thermally coupled to a cooling system such as a system of water channels to enable temperature control and cooling of the elements 542, 543 during operation.

Figure 6:
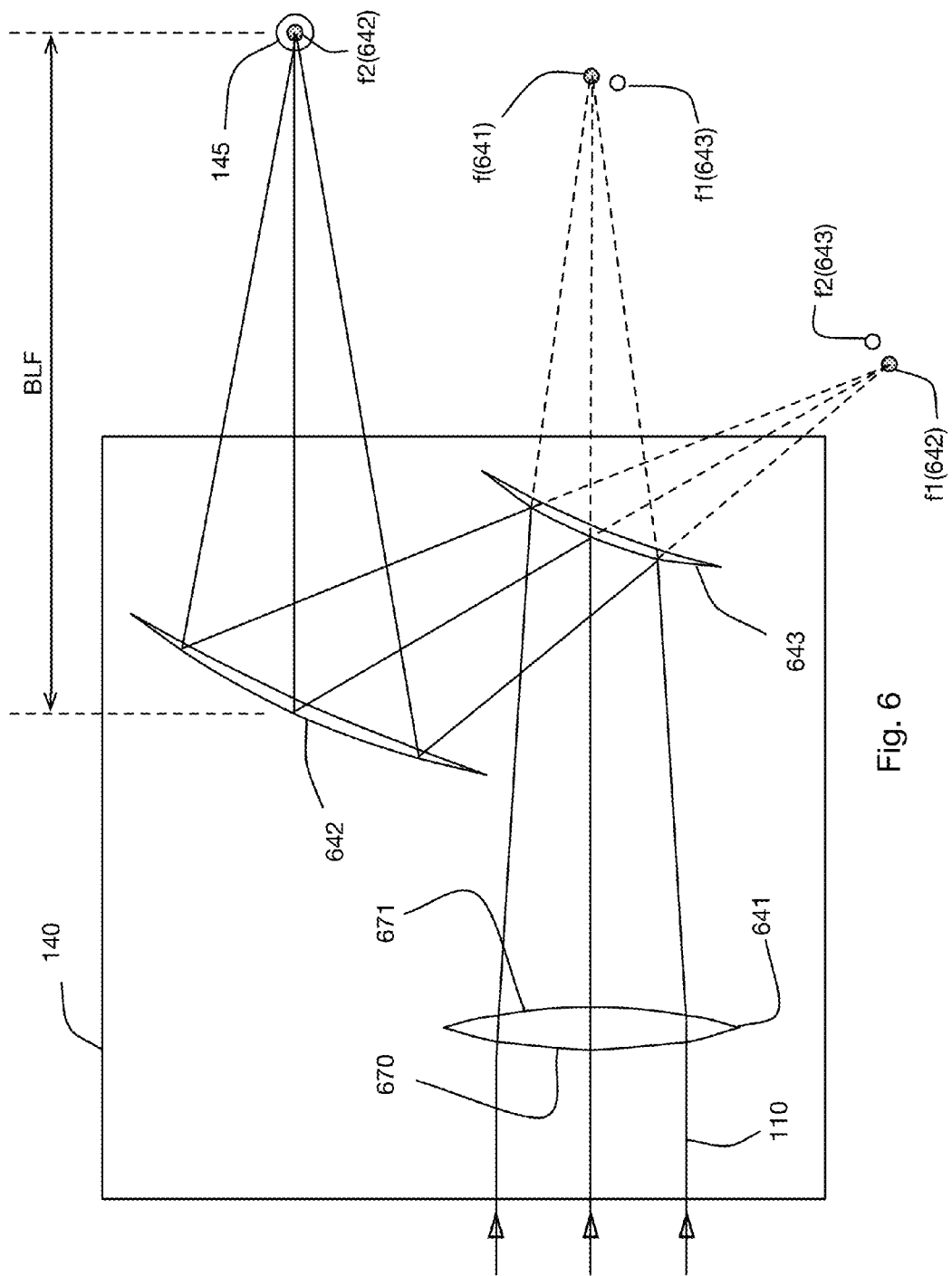
FIG. 6 is a block diagram showing the optical layout of an exemplary hybrid final focus assembly showing the relative placement of foci of the optical elements of the assembly.

Referring to FIG. 6, a discussion of the positions of the focal points for each optical element within the final focus assembly 140 is provided. In this example, the transmissive optical element 141 is a lens 641, the reflective optical element 142 is a concave elliptical mirror 642, and the final focus assembly includes another reflective optical element, which is a convex elliptical mirror 643.

In the implementation shown in FIG. 6, the focal points of each of these optical elements do not overlap or coincide geometrically with each other. The elliptical mirror 642 includes two focal points f1(642) and f2(642) and the elliptical mirror 643 includes two virtual focal points f1(643) and f2(643). In this exemplary implementation, a focal point f(641) of the lens 641 does not overlap with the first virtual focal point f1(643) of the mirror 643; the second focal point f2(643) of the mirror 643 does not overlap with the first focal point f1(642) of the mirror 642; and the second focal point f2(642) of the mirror 642 is at the focal location 145.

The quality of the amplified light beam 110 at the focal location 145 can be set up to be less sensitive to other tolerances, such as the positions of the optical elements and the shape of the surfaces of the optical elements that interact with the amplified light beam 110 by, for example, optimizing the focus of the amplified light beam 110 at the focal location 145 after offsetting the focal points of the optical elements within the final focus assembly 140.

Additionally, in some implementations, a back focal length (BFL) of the optical element within the final focus assembly 140 that is closest to the focal location 145 (which can be referred to as a final focusing element) is greater than an effective focal length (EFL) of the final focus assembly 140. The effective focal length of the final focus assembly 140 is the geometric net focal length from all of the wavefront modifying optical elements within the final focus assembly 140. For example, the back focal length BFL from the mirror 642 is greater than the effective focal length (EFL) of the final focus assembly of FIG. 6.

With the same effective focal length (and input beam diameter), the focused numerical aperture is the same (thus the size of the final focused spot at the focal location 145 is the same), but the final focusing element (for example, the mirror 642) is farther away (that is, longer back focal length, BFL) thus offering better protection for the element (such as the mirror 642) against deposition of the target material. The quantity of the target material (such as tin) that is deposited on the final focusing element is proportional to the square of the distance from plasma event (at the target location 130 or the focal location 145 or near the target location 130 and the focal location 145), assuming the entrance aperture is the same over the same amount of time.

In an example, the BFL for the mirror 642 is approximately 500 mm, while the EFL is approximately 347 mm (a slightly longer EFL gives a slightly larger focused spot size at the focal location 145). Thus, in this example, the amount of debris (from the target material) reaching the final focusing element (the mirror 642) is approximately $(300/500)_2$ which is about 36% that of a prior non-hybrid final focus assembly that uses a single refractive element (such as a lens). In this way, because the lifetime of the final focusing element is defined by the amount of target material deposited on it, the lifetime of the final focusing element is extended (when compared with a prior non-hybrid final focus assembly) by a factor of about three. The lifetime of the final focusing element can be extended even more by cooling the backside of the mirror 642.

In some implementations, such as shown in FIG. 6, the transmissive optical element 641 includes two convex curved surfaces 670, 671. In this design, it is possible for the curved surface 670 to be a conic section (that is aspheric) and for the curved surface 671 to be a conic section that is spherical. In some implementation, the transmissive optical element 641 can be a meniscus lens, with either of the curved surfaces 670, 671 being either convex or concave.

In some implementations, one or more of the reflective optical elements 142 can be prisms having a curved reflective surface that can use total internal reflection to achieve the reflectivity.

Figure 7:
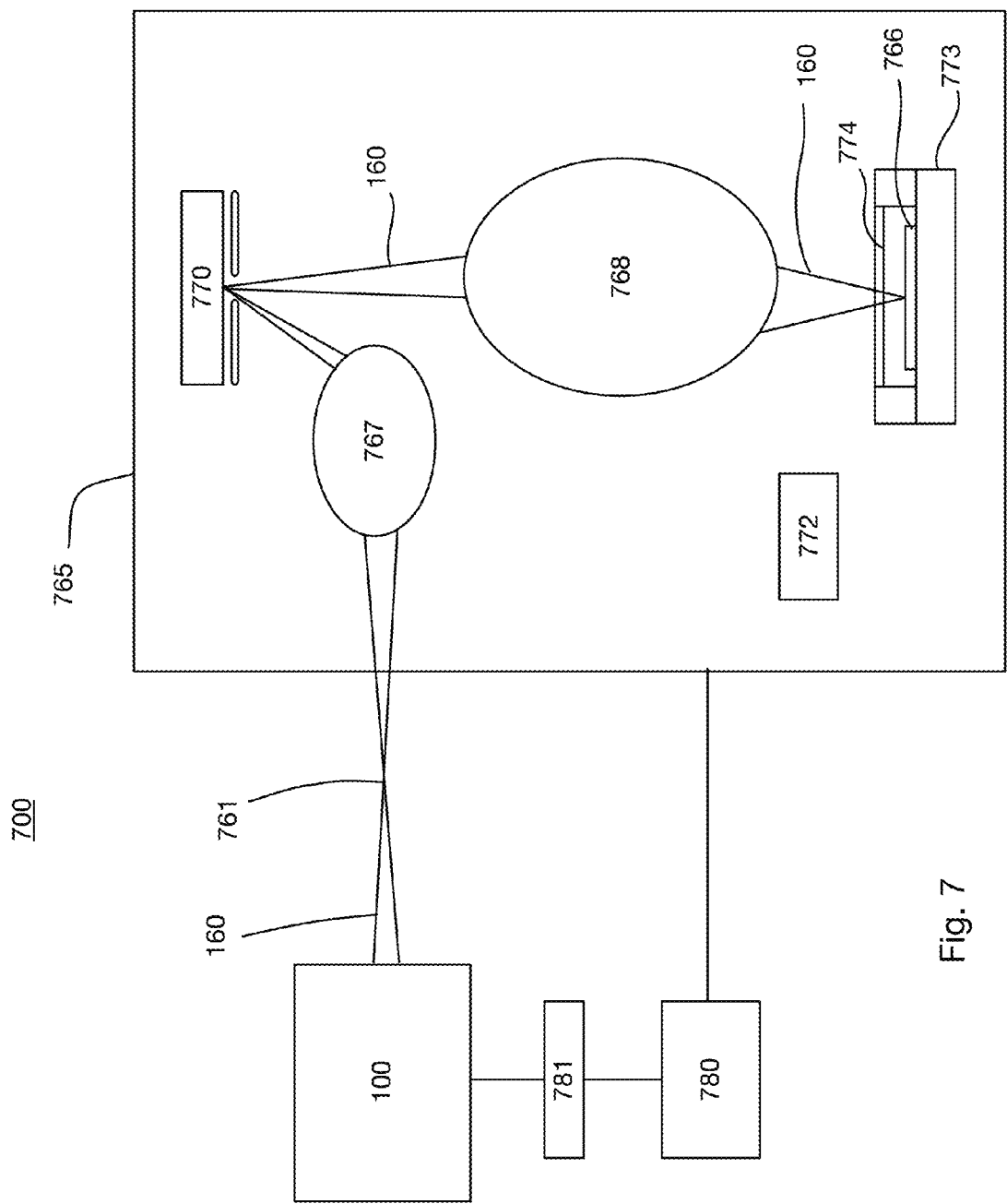
FIG. 7 is a block diagram of an exemplary photolithography system in which the extreme ultraviolet system that includes the hybrid final focus assembly of FIGS. 1-6 can be used.

Referring to FIG. 7, in some implementations, the extreme ultraviolet light system 100 is used in a photolithography system 700 to supply extreme ultraviolet (EUV) light 160 to an optical apparatus such as a lithography exposure apparatus 765. The photolithography system 700 includes one or more master controller 780 connected to one or more control or actuation systems 781 that are connected to components within the extreme ultraviolet light system 100, as discussed in greater detail with reference to FIG. 8.

The EUV light 160 is directed to the lithography exposure apparatus 765, which uses this light 160 to create a pattern on a wafer 766. The EUV light 160 may be directed through an illuminator 767, which can include optical elements such as reflective optical elements that modify aspects such as the wavefront curvature of the EUV light 160. For example, the illuminator 767 can include one or more reflectors coated with a special coating (such as a multilayer coating) that is able to reflect as much EUV light 160 as possible. Because such reflectors tend to absorb some of the EUV light 160, it may be advantageous to use as few as possible.

The EUV light 160 exiting the illuminator 767 is directed to a reflective mask 770. The EUV light 160 exiting the reflective mask 770 is directed through a set 768 of projection optics, which include one or more reflectors coated with a special coating for reflecting the EUV light 160 and also are configured to focus the EUV light 160 to the wafer 766. The projection optics set 768 adjusts the range of angles for the EUV light 160 impinging on the wafer 766, and enables the image transfer to occur from the reflective mask 770 to the photoresist on the wafer 766. For example, the projection optics set 768 can include a series of four to six curved mirrors, reducing the size of the image and focusing the image onto the wafer 766. Each of these mirrors bends the EUV light 160 slightly to form the image that will be transferred onto the wafer 766.

Moreover, the lithography exposure apparatus 767 can include, among other features, a lithography controller 772, air conditioning devices, and power supplies for the various electrical components. In some implementations, the wafer 766 is carried on a wafer stage 773 and an immersion medium 774 can be supplied to cover the wafer 766 for immersion lithography. In other implementations, the wafer 766 is not covered by an immersion medium 774.

The wafer 766 can be processed using any number of process steps, which can be one or more of a combination of process steps such as etching, deposition, and lithography processes with a different mask to create a pattern of openings (such as grooves, channels, or holes) in the material of the wafer or in materials deposited on the wafer. These openings can be filled with insulative, conductive, or semiconductive materials to build layers of the microelectronic features on the wafer. The wafer is then singulated to form individual chips, which can be incorporated into a wide variety of electronic products, such as computers and other consumer or industrial electronic devices.

Figure 8:
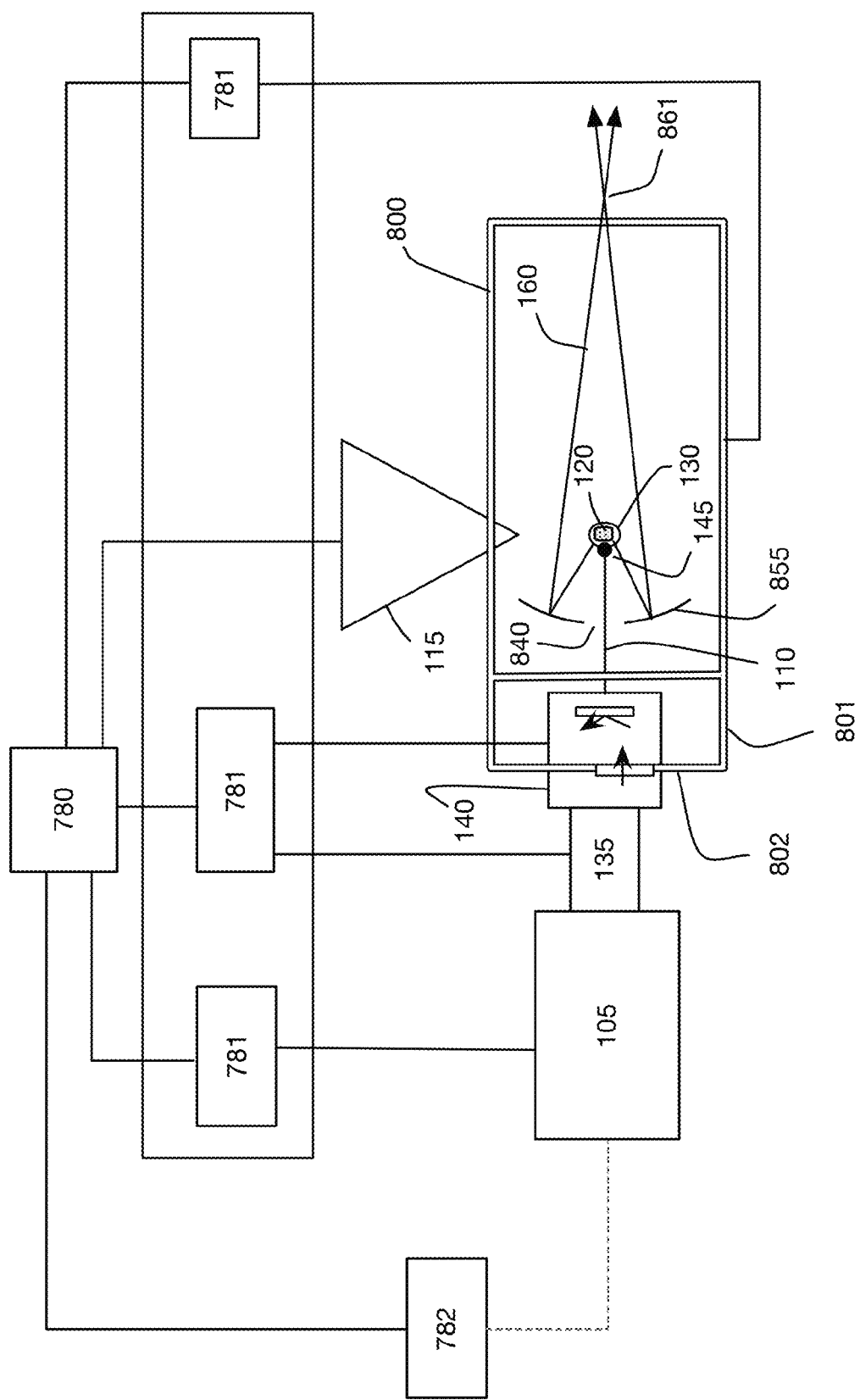
FIG. 8 is a block diagram of an exemplary extreme ultraviolet system in which the hybrid final focus assembly of FIGS. 1-6 can be used.

Referring to FIG. 8, in some implementations, the extreme ultraviolet light system 100 is a part of a system that includes other components, such as a vacuum chamber 800, one or more controllers 780, one or more actuation systems 781, and a guide laser 782.

The vacuum chamber 800 can be a single unitary structure or it can be set up with separate sub-chambers that house specific components. The vacuum chamber 800 is at least a partly rigid enclosure from which air and other gases are removed by a vacuum pump, resulting in a low pressure environment within the chamber 800. The walls of the chamber 800 can be made of any suitable metals or alloys that are suitable for vacuum use (can withstand the lower pressures).

Additionally, the final focus assembly 140 can be positioned entirely outside of the vacuum chamber 800, can be positioned partly inside the vacuum chamber 800 (so that some of the components of the assembly 140 are inside the low pressure environment while others are outside the low pressure environment, or can be entirely inside the vacuum chamber 800. Or, the final focus assembly 140 can be partly inside a sub-chamber 801 of the vacuum chamber 800. For example, as shown in FIG. 8, the final focus assembly 140 is partly inside a sub-chamber 801 of the vacuum chamber 800 because the transmissive optical element 141 is mounted on the exterior wall 802 of the vacuum chamber 800 (or sub-chamber 801). Another example of such a setup is also shown in FIG. 5. The transmissive optical element 541 is mounted into the outside wall 802 of the vacuum chamber 800 (or the sub-chamber 801) and thus all of the components between the transmissive optical element 541 and the focal location 145 are in the low pressure environment within the vacuum chamber 800.

It is also possible to mount the transmissive optical element 541 to a moveable bellows 803 that is mounted in the wall 802 and vacuum or hermetically sealed to enable the translation of the transmissive optical element 541 along the direction 551 while still maintaining the low pressure environment inside the vacuum chamber 800. The bellows 803 is a flexible part of the pressure wall 802 of the chamber 800, holding vacuum inside while also providing motion (in this case, motion of the transmissive optical element 541) inside the chamber 800. One benefit to this set up is that the entire assembly 140 need not be translated in order to adjust the focal location 145.

The target material delivery system 115 delivers the target material 120 to the target location 130. The target material 120 at the target location can be in the form of liquid droplets, a liquid stream, solid particles or clusters, solid particles contained within liquid droplets or solid particles contained within a liquid stream. The target material 120 can include, for example, water, tin, lithium, xenon, or any material that, when converted to a plasma state, has an emission line in the EUV range. For example, the element tin can be used as pure tin (Sn), as a tin compound, for example, $SnBr_4$, $SnBr_2$, $SnH_4$, as a tin alloy, for example, tin-gallium alloys, tin-indium alloys, tin-indium-gallium alloys, or any combination of these alloys. The target material 120 can include a wire coated with one of the above elements, such as tin. If the target material 120 is in a solid state, it can have any suitable shape, such as a ring, a sphere, or a cube. The target material 120 can be delivered by the target material delivery system 115 into the interior of the chamber 800 and to the target location 130. The target location 130 is also referred to as an irradiation site, the place where the target material 120 optically interacts with the amplified light beam 110 to produce the plasma.

The drive laser system 105 can include one or more optical amplifiers, lasers, and/or lamps for providing one or more main pulses and, in some cases, one or more pre-pulses. Each optical amplifier includes a gain medium capable of optically amplifying the desired wavelength at a high gain, an excitation source, and internal optics. The optical amplifier may or may not have laser mirrors or other feedback devices that form a laser cavity. Thus, the drive laser system 105 produces the amplified light beam 110 due to the population inversion in the gain media of the laser amplifiers even if there is no laser cavity. Moreover, the drive laser system 105 can produce an amplified light beam 110 that is a coherent laser beam if there is a laser cavity to provide enough feedback to the drive laser system 105. The term "amplified light beam" encompasses one or more of: light from the drive laser system 105 that is merely amplified but not necessarily a coherent laser oscillation and light from the drive laser system 105 that is amplified and is also a coherent laser oscillation.

The optical amplifiers in the drive laser system 105 can include as a gain medium a filling gas that includes $CO_2$ and can amplify light at a wavelength of between about 9100 and about 11000 nm, and in particular, at about 10600 nm, at a gain greater than or equal to 1000. Suitable amplifiers and lasers for use in the drive laser system 105 can include a pulsed laser device, for example, a pulsed, gas-discharge $CO_2$ laser device producing radiation at about 9300 nm or about 10600 nm, for example, with DC or RF excitation, operating at relatively high power, for example, 10 kW or higher and high pulse repetition rate, for example, 50 kHz or more. The optical amplifiers in the drive laser system 105 can also include a cooling system such as water that can be used when operating the drive laser system 105 at higher powers.

The light collector 155 can be a collector mirror 855 having an aperture 840 to allow the amplified light beam 110 to pass through and reach the focal location 145. The collector mirror 855 can be, for example, an ellipsoidal mirror that has a first focus at the target location 130 or the focal location 145, and a second focus at an intermediate location 861 (also called an intermediate focus) where the EUV light 160 can be output from the extreme ultraviolet light system and can be input to the optical apparatus 165.

The one or more controllers 780 are connected to the one or more actuation systems or diagnostic systems, such as, for example, a droplet position detection feedback system, a laser control system, and a beam control system, and one or more target or droplet imagers. The target imagers provide an output indicative of the position of a droplet, for example, relative to the target location 130 and provide this output to the droplet position detection feedback system, which can, for example, compute a droplet position and trajectory from which a droplet position error can be computed either on a droplet by droplet basis or on average. The droplet position detection feedback system thus provides the droplet position error as an input to the controller 780. The controller 780 can therefore provide a laser position, direction, and timing correction signal, for example, to the laser control system that can be used, for example, to control the laser timing circuit and/or to the beam control system to control an amplified light beam position and shaping of the beam transport system to change the location and/or focal power of the beam focal spot within the chamber 800.

The target material delivery system 115 includes a target material delivery control system that is operable in response to a signal from the controller 780, for example, to modify the release point of the droplets as released by an internal delivery mechanism to correct for errors in the droplets arriving at the desired target location 130.

Additionally, extreme ultraviolet light system can include a light source detector that measures one or more EUV light parameters, including but not limited to, pulse energy, energy distribution as a function of wavelength, energy within a particular band of wavelengths, energy outside of a particular band of wavelengths, and angular distribution of EUV intensity and/or average power. The light source detector generates a feedback signal for use by the controller 780. The feedback signal can be, for example, indicative of the errors in parameters such as the timing and focus of the laser pulses to properly intercept the droplets in the right place and time for effective and efficient EUV light production.

In some implementations, the drive laser system 105 has a master oscillator/power amplifier (MOPA) configuration with multiple stages of amplification and having a seed pulse that is initiated by a Q-switched master oscillator (MO) with low energy and high repetition rate, for example, capable of 100 kHz operation. From the MO, the laser pulse can be amplified, for example, using RF pumped, fast axial flow, $CO_2$ amplifiers to produce the amplified light beam 110 traveling along a beam path.

Although three optical amplifiers can be used, it is possible that as few as one amplifier and more than three amplifiers could be used in this implementation. In some implementations, each of the $CO_2$ amplifiers can be an RF pumped axial flow $CO_2$ laser cube having a 10 meter amplifier length that is folded by internal mirrors.

Alternatively, the drive laser system 105 can be configured as a so-called "self-targeting" laser system in which the target material 120 serves as one mirror of the optical cavity. In some "self-targeting" arrangements, a master oscillator may not be required. The drive laser system 105 includes a chain of amplifier chambers, arranged in series along a beam path, each chamber having its own gain medium and excitation source, for example, pumping electrodes. Each amplifier chamber can be an RF pumped, fast axial flow, $CO_2$ amplifier chamber having a combined one pass gain of, for example, 1,000-10,000 for amplifying light of a wavelength λ of, for example, 10600 nm. Each of the amplifier chambers can be designed without laser cavity (resonator) mirrors so that when set up alone they do not include the optical components needed to pass the amplified light beam through the gain medium more than once. Nevertheless, as mentioned above, a laser cavity can be formed as follows.

In this implementation, a laser cavity can be formed by adding a rear partially reflecting optic to the drive laser system 105 and placing the target material 120 at the target location 130. The optic can be, for example, a flat mirror, a curved mirror, a phase-conjugate mirror, a grating, or a corner reflector having a reflectivity of about 95% for wavelengths of about 10600 nm (the wavelength of the amplified light beam 110 if $CO_2$ amplifier chambers are used). The target material 120 and the rear partially reflecting optic act to reflect some of the amplified light beam 110 back into the drive laser system 105 to form the laser cavity. Thus, the presence of the target material 120 at the target location 130 provides enough feedback to cause the drive laser system 105 to produce coherent laser oscillation and in this case, the amplified light beam 110 can be considered a laser beam. When the target material 120 isn't present at the target location 130, the drive laser system 105 may still be pumped to produce the amplified light beam 110 but it would not produce a coherent laser oscillation unless some other component provides enough feedback. This arrangement can be a so-called "self-targeting" laser system in which the target material 120 serves as one mirror (a so-called plasma mirror or mechanical q-switch) of the optical cavity.

Depending on the application, other types of amplifiers or lasers can also be suitable, for example, an excimer or molecular fluorine laser operating at high power and high pulse repetition rate. Examples include a solid state laser, for example, having a fiber or disk shaped gain medium, a MOPA configured excimer laser system, as shown, for example, in U.S. Pat. Nos. 6,625,191; 6,549,551 and 6,567,450; an excimer laser having one or more chambers, for example, an oscillator chamber and one or more amplifying chambers (with the amplifying chambers in parallel or in series); a master oscillator/power oscillator (MOPO) arrangement, a power oscillator/power amplifier (POPA) arrangement; or a solid state laser that seeds one or more excimer or molecular fluorine amplifier or oscillator chambers, may be suitable. Other designs are possible.

At the irradiation site, the amplified light beam 110, suitably focused by the final focus assembly 140, is used to create plasma having certain characteristics that depend on the composition of the target material 120. These characteristics can include the wavelength of the EUV light 160 produced by the plasma and the type and amount of debris released from the plasma. The amplified light beam 110 evaporates the target material 120, and heats the vaporized target material to a critical temperature at which electrons are shed (a plasma state), leaving behind ions, which are further heated until they start emitting photons having a wavelength in the extreme ultraviolet range.

Figure 9:
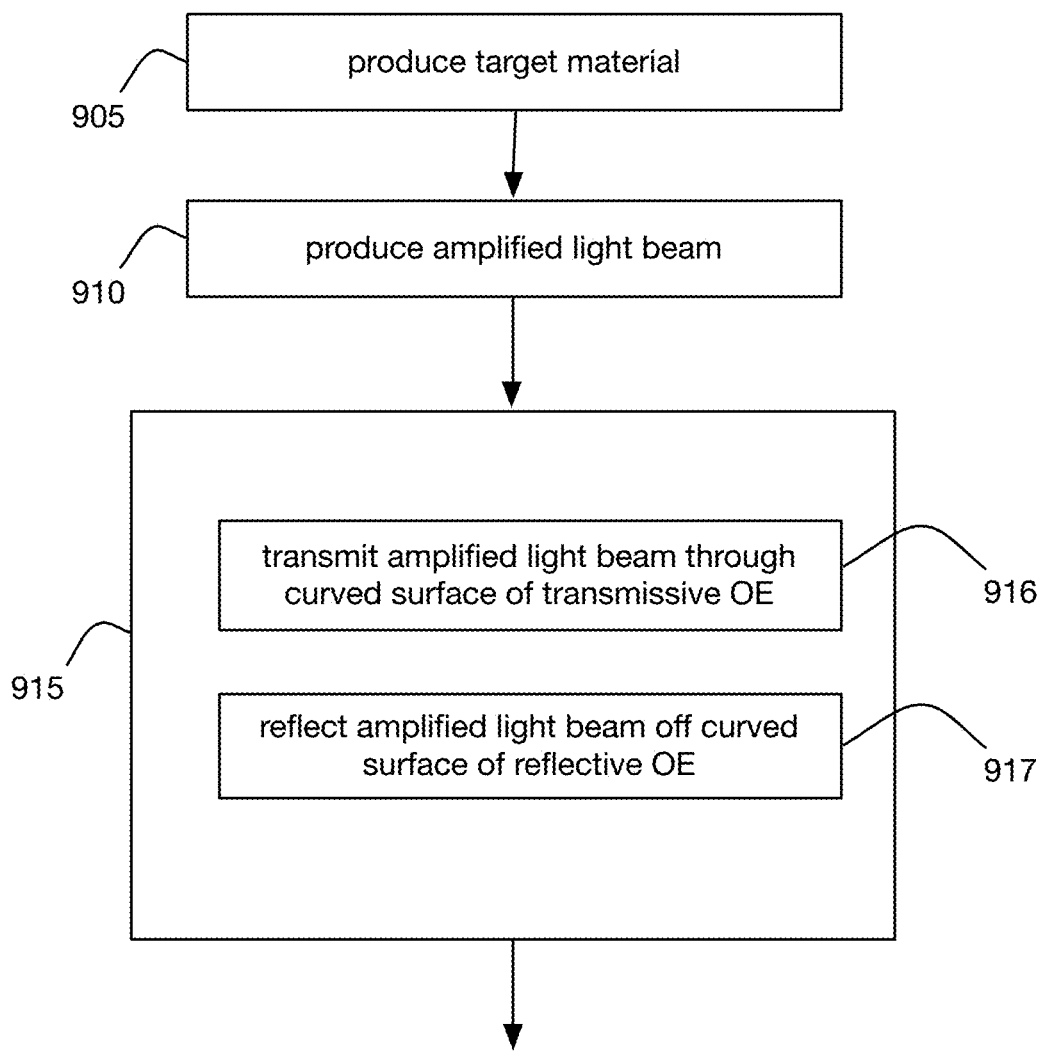
FIG. 9 is a flow chart of a procedure performed by the extreme ultraviolet system of FIGS. 1-6 for focusing an amplified light beam to a focal location.

Referring to FIG. 9, a procedure 900 is performed by the extreme ultraviolet light system 100 to produce the EUV light 150. The target material 120 is produced at the target location 130 (905). The amplified light beam 110 is produced (910). For example, the amplified light beam 110 can be produced (910) by supplying pump energy to a gain medium of at least one optical amplifier in the drive laser system 105. The amplified light beam 110 is focused onto the focal location 145 (915), which enables optical interaction between the amplified light beam 110 and the target material 120 to cause the target material 120 to be converted into a plasma that emits extreme ultraviolet light 150. The amplified light beam 110 is focused by modifying a wavefront curvature of the amplified light beam 110 by transmitting the amplified light beam 110 through the curved surface of the transmissive optical element 141 (916) and by modifying the wavefront curvature of the amplified light beam 110 including reflecting the amplified light beam 110 off the curved surface of the reflective optical element 142 (917). The reflection of the amplified light beam 110 off the curved surface of the reflecting optical element 142 can take place after the amplified light beam 110 has been transmitted through the curved surface of the transmissive optical element 141 (916).

The procedure can include additional steps. For example, the amplified light beam 110 can be focused by further modifying the wavefront curvature of the amplified light beam 110 by reflecting the amplified light beam 110 transmitted through the curved surface of the transmissive optical element 141 off a curved surface of another reflective optical element.

Additionally, the procedure 900 can also include cooling a non-reflective side of the reflective optical element. The procedure 900 can include adjusting the focal location by translating the transmissive optical element 141 along the optical axis of the amplified light beam 110. The procedure 900 can also include overlapping the focal location with the target location.

Other implementations are within the scope of the following claims.

What is claimed is:
1. An extreme ultraviolet light system comprising:
a target material delivery system configured to produce a target material; and
a beam delivery system that is configured to receive an amplified light beam and to direct the amplified light beam toward a target location that receives the target material, the beam delivery system including a final focus assembly that focuses the amplified light beam at a focal location that enables interaction between the amplified light beam and the target material to cause the target material to be converted into a plasma that emits extreme ultraviolet light, the final focus assembly comprising:
at least one transmissive optical element having at least one curved surface through which the amplified light beam travels, wherein the amplified light beam that exits the at least one transmissive optical element is converging;
a convex reflective optical element that receives the amplified light beam transmitted through the at least one transmissive optical element, wherein the ampli- fied light beam reflected from the convex reflective optical element is diverging; and a concave reflective optical element that receives the diverging amplified light beam reflected from the convex reflective optical element, and reflects amplified light beam on a path toward the target location, wherein the amplified light beam reflected from the concave reflective optical element is converging and focused at the target location.

2. The light system of claim 1, wherein the at least one transmissive optical element is passive.

3. The light system of claim 1, further comprising a moveable stage on which the transmissive optical element is attached, the moveable stage moving along a direction that is parallel with or at an angle relative to the optical axis of the amplified light beam as it passes through the transmissive optical element.

4. The light system of claim 1, wherein the at least one transmissive optical element comprises a lens.

5. The light system of claim 4, wherein the curved surface of the lens is a conic section.

6. The light system of claim 4, wherein the curved surface of the lens is convex.

7. The light system of claim 1, wherein the at least one transmissive optical element is made of a crystalline solid.

8. The light system of claim 7, wherein the crystalline solid is Zinc Selenide.

9. The light system of claim 1, wherein each of the convex reflective optical element and the concave reflective optical element has a curved surface that is a conic section.

10. The light system of claim 9, wherein the conic section is an ellipse.

11. The light source of claim 1, wherein respective focal points of the convex reflective optical element and the concave reflective optical element do not coincide with each other.

12. The light system of claim 1, wherein the at least one transmissive optical element is farther away from the target location than the convex and concave reflective optical elements.

13. The light system of claim 1, wherein the at least one transmissive optical element is outside of a direct path of target material that is ejected away from the target location when the amplified light beam is focused at the focal location and the target material interacts with the focused amplified light beam.

14. The light system of claim 1, wherein the at least one transmissive optical element is greater than 400 mm from the target location.

15. The light system of claim 1, wherein the focal location overlaps one or more of the target location and the target material.

16. The light system of claim 1, wherein a focal length of the optical element within the final focus assembly that is closest to the focal location is greater than an effective focal length of the final focus assembly.

17. The light system of claim 1, further comprising a hermetically-sealed chamber in which the target location is located, wherein the transmissive optical element is mounted on an exterior wall of the chamber.

18. The light system of claim 17, wherein the transmissive optical element is mounted to a moveable bellows that is hermetically sealed in the wall of the chamber to enable translation of the transmissive optical element relative to the at least one reflective optical element.

19. An extreme ultraviolet light system comprising:

a target material delivery system configured to produce a target material; and a beam delivery system that is configured to receive an amplified light beam and to direct the amplified light beam toward a target location that receives the target material, the beam delivery system comprising:

beam directing optical elements configured to receive the amplified light beam emitted from the drive laser system and to direct the amplified light beam along a first direction; and a final focus assembly between the beam directing optical elements and the target location, the final focus assembly configured to focus the amplified light beam at a focal location that enables interaction between the amplified light beam and the target material to cause the target material to be converted into a plasma that emits extreme ultraviolet light, the final focus assembly comprising:

a convex reflective optical element that receives the amplified light beam from the beam directing optical elements, wherein the amplified light beam reflected from the convex reflective optical element is diverging; and a concave reflective optical element that receives the diverging amplified light beam reflected from the convex reflective optical element, and reflects amplified light beam on a path toward the target location, wherein the amplified light beam reflected from the concave reflective optical element is converging and focused at the target location wherein each of the convex reflective optical element and the concave reflective optical element has a reflective curved surface that is a conic section, the reflective curved surface of the convex reflective element is parabolic, and the reflective curved surface of the concave reflective optical element is elliptical wherein the concave reflective optical element and the convex reflective optical element are geometrically arranged so that the convex reflective optical element is along the first direction, closer to the target location than the concave reflective optical element such that a gap is formed between the convex reflective optical element and the concave reflective optical element along the first direction the path followed by the amplified light beam as it reflects from the concave reflective optical element subtends an acute angle and all the rays of the amplified light beam reflected from the convex reflective optical element are directed away from the target location along at least one direction that is antiparallel with the first direction.

20. The light system of claim 19, wherein the focal location overlaps one or more of the target location and the target material.

21. The light system of claim 19, wherein each of the convex reflective optical element and the concave reflective optical element is made of a substrate and the reflective curved surfaces are formed by a reflective coating on the substrate.

22. The light system of claim 21, wherein one or more of the substrate and the reflective coating are made of metal or metal alloy.

23. A method for producing extreme ultraviolet light, the method comprising:
- producing a target material at a target location;
- receiving an amplified light beam and directing the amplified light beam; and
- focusing the amplified light beam onto a focal location that enables optical interaction between the amplified light beam and the target material to cause the target material to be converted into a plasma that emits extreme ultraviolet light, wherein focusing the amplified light beam comprises:
  - positively altering a wavefront curvature of the amplified light beam by transmitting the amplified light beam through a curved surface of a transmissive optical element;
  - negatively altering the wavefront curvature of the amplified light beam by reflecting the amplified light beam that was transmitted through the curved surface of the transmissive optical element off a convex curved surface of a first reflective optical element; and
  - positively altering the wavefront curvature of the amplified light beam by reflecting the amplified light beam that was reflected off the convex curved surface off a concave curved surface of a second reflective optical element so that the amplified light beam is focused to the target location.

24. The method of claim 23, further comprising cooling a non-reflective side of the first or second reflective optical element.

25. The method of claim 24, further comprising adjusting the focal location by translating the transmissive optical element along a direction that is parallel with or at an angle to the optical axis of the amplified light beam.

26. The method of claim 23, further comprising overlapping the focal location with the target location.

* * * * *